(12) United States Patent
Carr et al.

(10) Patent No.: US 8,701,204 B2
(45) Date of Patent: *Apr. 15, 2014

(54) SHARING REFERENCED CONTENT THROUGH COLLABORATIVE BUSINESS APPLICATIONS

(75) Inventors: Derek W. Carr, Apex, NC (US); Michael D. Facemire, Pittsboro, NC (US); Stephen J. Foley, Quincy, MA (US); Michael C. Wanderski, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/542,912

(22) Filed: Jul. 6, 2012

(65) Prior Publication Data
US 2012/0271856 A1    Oct. 25, 2012

Related U.S. Application Data

(63) Continuation of application No. 12/546,477, filed on Aug. 24, 2009, now Pat. No. 8,245,273.

(51) Int. Cl.
*H04L 29/06* (2006.01)

(52) U.S. Cl.
USPC ............................................ 726/26

(58) Field of Classification Search
USPC ............................................ 726/26
See application file for complete search history.

(56) References Cited

U.S. PATENT DOCUMENTS

| | | | |
|---|---|---|---|
| 7,984,066 B1 * | 7/2011 | Kilday et al. | 707/781 |
| 2005/0021938 A1 * | 1/2005 | Kidokoro | 713/152 |
| 2005/0259654 A1 * | 11/2005 | Faulk, Jr. | 370/392 |
| 2008/0028017 A1 * | 1/2008 | Garbow et al. | 709/201 |
| 2009/0191845 A1 * | 7/2009 | Morgan et al. | 455/411 |

* cited by examiner

*Primary Examiner* — Jason Gee
(74) *Attorney, Agent, or Firm* — Thomas E. Lees, LLC

(57) ABSTRACT

Referenced content is shared through collaborative business applications by detecting referenced content in an electronic communication. The referenced content references content stored in an external repository. The referenced content identifies a registered external repository connector. A determination is made whether an Access Control List ("ACL") for the referenced content lacks an entry for a recipient of the electronic communication. Also an ACL entry is generated for the recipient in response to the recipient lacking an entry in the ACL for the referenced content. The ACL entry controls access to the referenced content for the recipient.

20 Claims, 5 Drawing Sheets

SHARING REFERENCED CONTENT THROUGH COLLABORATIVE BUSINESS APPLICATIONS

CROSS-REFERENCE TO RELATED APPLICATIONS

This application is a continuation of U.S. patent application Ser. No. 12/546,477, entitled SHARING REFERENCED CONTENT THROUGH COLLABORATIVE BUSINESS APPLICATIONS, filed Aug. 24, 2009, now allowed, the disclosure of which is incorporated by reference herein.

BACKGROUND

This invention relates to referenced content and more particularly relates to sharing referenced content through collaborative business applications.

Users commonly share content with other users by sending attachments in electronic communication such email or instant messages. As more content is being stored in server-managed repositories or online data stores, it has also become more common to share referenced content instead of the actual content. One example is when a file is not attached to an email, but instead a link is inserted into the body of the email representing the referenced file. Referenced content helps reduce inbox clutter, manage quotas, and ensures that the latest version of the file is available.

Online content is shared freely in social networks allowing easier access and enabling simpler sharing scenarios. Examples of these social sharing systems and network repositories include IBM Lotus products such as Lotus Quickr and Lotus Connections, as well as products like Microsoft SkyDrive and Sharepoint.

However, the introduction of online storage of referenced content, social networks and sharing, and collaborative distribution applications like email and instant messaging, makes securely managing access to content in business environments difficult. In a business environment, governance and security often require stricter access control, as well as auditing of access. Some consumer social networking applications in which content is typically implicitly shared have tried techniques such as a "secret Uniform Resource Locator ('URL')" to make the content "semi-secure" in that a user would have to know or guess the URL to gain access to the content. While a secret URL may suffice for simple and free consumer based websites, a secret URL would be considered a security problem in enterprise grade software.

Furthermore, an organization will typically use a content management system that controls who may view, edit, or delete content in the organization. However, such content management systems require maintenance and updating to continually control who has access to what content.

BRIEF SUMMARY

According to aspects of the present invention, referenced content is shared through collaborative business applications by detecting referenced content in an electronic communication that is processed by a messaging server, the referenced content referencing content stored in an external repository. Referenced content is further shared by determining a registered external repository connector identified by the detected content, where the external repository connector interfaces with a content server associated with the external repository and a content access controller that controls access to the referenced content based upon an access control list. Referenced content is still further shared by determining that the access control list for the referenced content lacks an entry for a recipient of the electronic communication and by generating an entry in the access control list for the recipient in response to the recipient lacking an entry in the access control list for the referenced content, the entry controlling access to the referenced content for the recipient.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE SEVERAL VIEWS OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
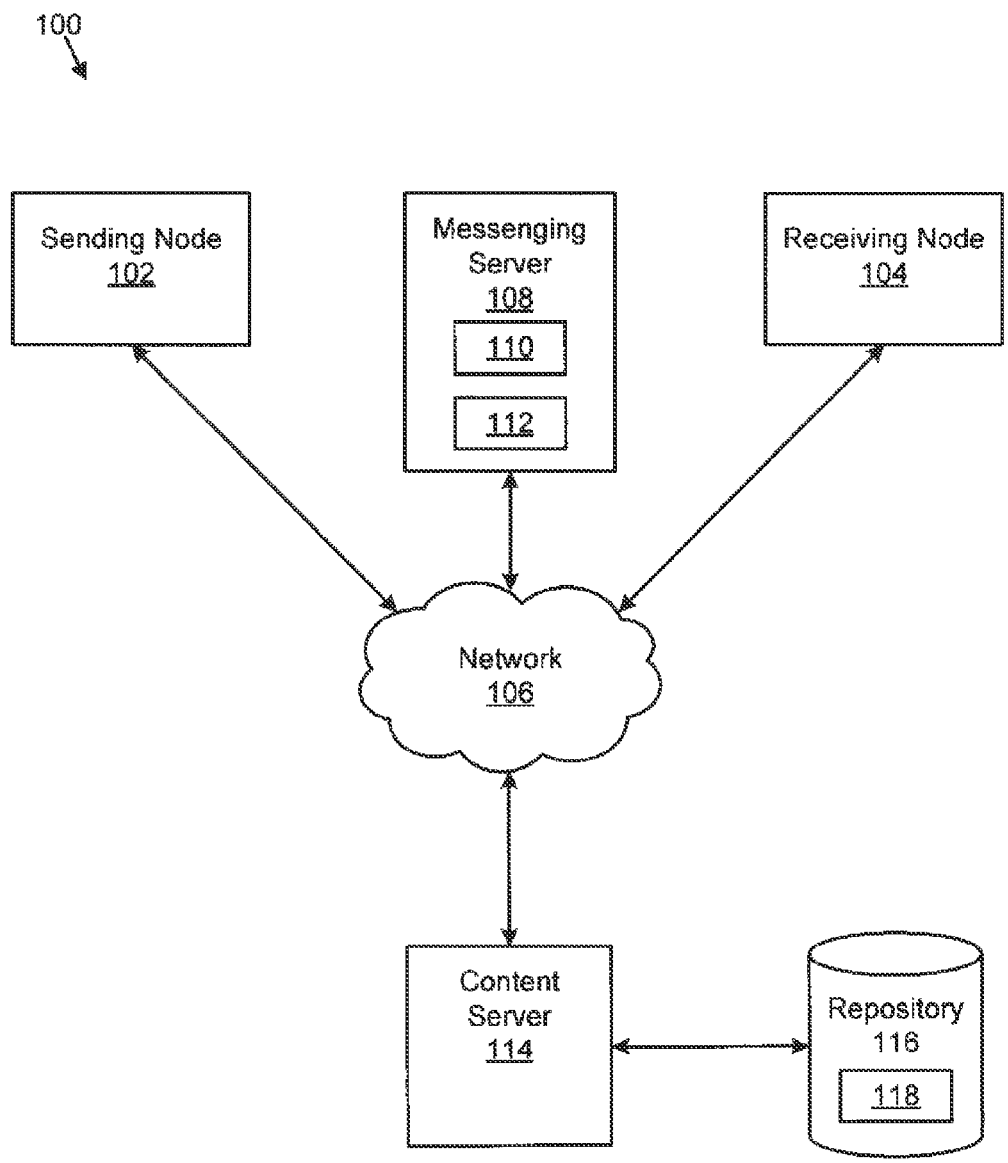
FIG. 1 is a schematic block diagram illustrating one embodiment of a system for sharing referenced content through collaborative business applications in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 illustrates one embodiment of a system 100 for sharing referenced content through collaborative business applications in accordance with the present invention. The system 100 includes a sending node 102, a receiving node 104, a network 106, a messaging server 108 with a content access controller 110 and a registered external repository connector 112, and a content server 114 in communication with a repository 116 storing referenced content 118.

The sending node 102 may comprise an electronic device capable of sending an electronic message and may include a workstation, a computer system, an appliance, an application-specific integrated circuit ("ASIC"), a Personal Digital Assistant ("PDA"), a server, a server blade center, a server farm, a router, a switch, or the like. Furthermore, the sending node 102 may comprise a software application running on one or more electronic devices similar to those described above. Examples of such software applications include an email client, instant messaging client, chat client, a web browser capable of accessing a social networking website, and the like.

The receiving node 104 may also comprise an electronic device capable of receiving an electronic message and may also include a workstation, a computer system, an appliance, an ASIC, a PDA, a server, a server blade center, a server farm, a router, a switch, or the like. Furthermore, the receiving node 104 may also comprise a software application running on one or more electronic devices similar to those described above. Examples of such software applications include an email client, instant messaging client, chat client, a web browser capable of accessing a social networking website and the like.

The network 106 is configured to communicate data between a plurality of devices including the sending node 102 and the receiving node 104. The network 106 may comprise a LAN, a plurality of LANs, a localized network, the Internet, or other similar network. In another embodiment, the network 106 may comprise a communication bus or direct cable connection such as a serial or parallel cable connection.

The messaging server 108 may comprise a workstation, a computer system, an appliance, an ASIC, a PDA, a server, a server blade center, a server farm, a router, a switch, or the like. Furthermore, the messaging server 108 may comprise a software application running on one or more electronic devices similar to those described above.

The messaging server 108 may include a software application that manages and facilitates electronic communication and collaborative applications. The messaging server 108 facilitates communication between the sender node and the receiver node. The messaging server 108 may comprise a mail server or a messaging platform such as Lotus Notes by International Business Machines ("IBM"), a Lotus Quickr user interface from IBM, a chat server, instant messaging server, and the like. In one embodiment, the messaging server 108 receives electronic communication from the sender node and forwards the electronic communication to the receiver node.

Although a single messaging server 108 is depicted in the illustrated embodiment of FIG. 1, a plurality of messaging servers 108 may be included in the system 100 for use with various communication protocols.

The messaging server 108 may include the content access controller 110. In one embodiment, the content access controller 110 is an integrated software application such as a plug-in installed on the messaging server 108. In another embodiment, the content access controller 110 is an independent software application in communication with one or more messaging servers 108. One skilled in the art realizes that the content access controller 110 may be located on the same electronic device as the messaging server 108 or on a separate electronic device.

The content access controller 110 controls access to referenced content 118 shared through electronic communication. Specifically, the content access controller 110 works with collaborative applications, such as email, instant messaging, and social networking applications, to identify referenced content 118 in electronic communication and implicitly control access to such referenced content 118. The content access controller 110 may implicitly control access to referenced content 118 by automatically granting some form of access to the referenced content 118 to recipients of the electronic communication. The access granted to the referenced content 118 may also be determined by the content access controller 110 based on a predefined security policy.

For example, when an email message with a link to referenced content 118 is forwarded to a group of users, the referenced content 118 is automatically shared to the forwarding participants and the access rights to the referenced content 118 for this group of users are stored.

Therefore, the content access controller 110 eliminates the need for a "secret URL" with its associated security problems. In addition, the content access controller 110 also eliminates the need for a user to manually manage access rights and eliminates the overhead required to update a content management system. A user may now grant and control access to referenced content 118 by naturally using existing collaborative applications and social networking applications to send and receive electronic communication.

The messaging server 108 may also include a registered external repository connector 112. The registered external repository connector 112 may interface with a content server 114 that is compatible with the content access controller 110. The registered external repository connector 112 communicates with the content repository 116 through the content server 114 using the external repository's 116 supported programming interface. The registered external repository connector 112 may be registered with the content access controller 110 and may work with the content access controller 110 to determine access rights to content, grant access rights, and define new access control groups, as will be described in more detail hereafter.

In one embodiment, the registered external repository connector 112 is integrated with the content access controller 110. In another embodiment, the registered external repository connector 112 is embodied as a separate software application. Although a single registered external repository connector 112 is depicted in FIG. 1, a plurality of registered external repository connectors 112 may reside on the messaging server 108 to interface with a plurality of content servers 114. Thus, a user may obtain the benefit of the content access controller 110 when referencing content on a variety of content servers 114.

The content server 114 manages and facilitates access to content stored on the repository 116. The content server 114 may be implemented using a file system, a web server, a database or other similar data application. One example of a content server 114 is Lotus Quickr from IBM. The content server 114 is operationally connected to the repository 116 through a network such as a LAN, a plurality of LANs, a localized network, the Internet, or using a communication bus or direct cable connection such as a serial or parallel cable connection.

The repository 116 stores content 118 that may be referenced in electronic communication. The repository 116 may be implemented with persistent storage such as a disk drive or other form of persistent data storage device.

Figure 2:
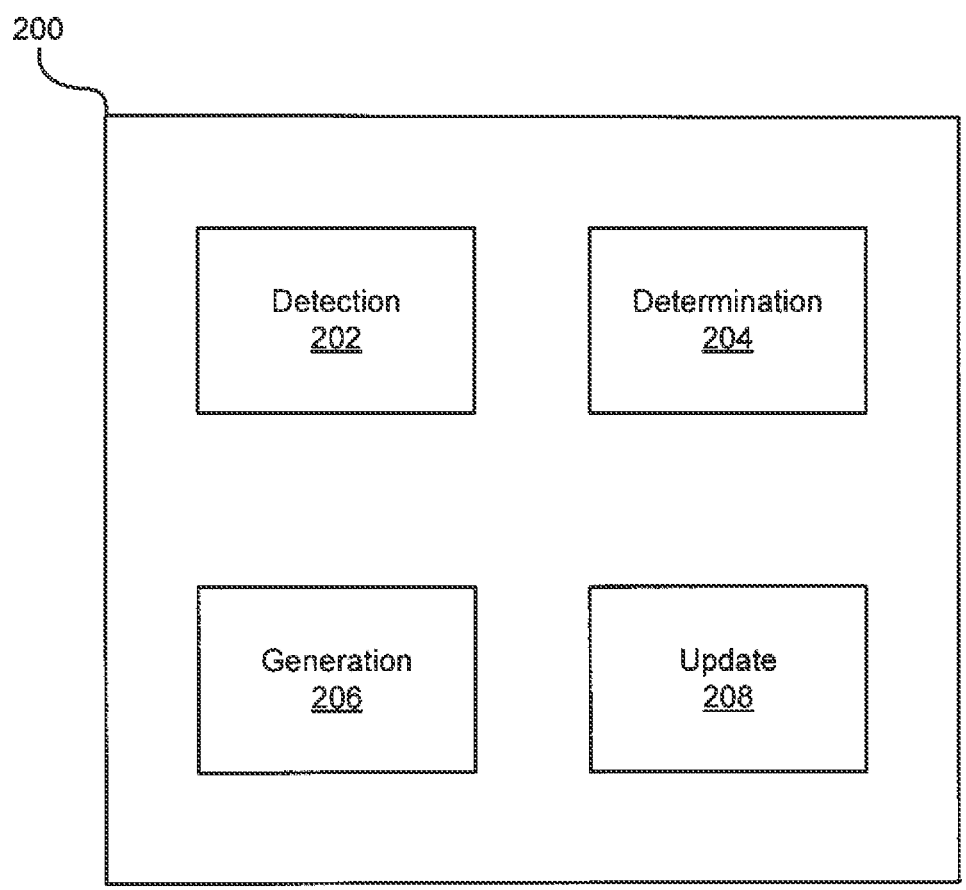
FIG. 2 is a schematic block diagram illustrating one embodiment of an computer program product for sharing referenced content through collaborative business applications in accordance with the present invention.

FIG. 2 illustrates one embodiment of a computer program product 200 for sharing referenced content 118 through collaborative business applications in accordance with the present invention. The computer program product 200 comprises one embodiment of the content access controller 110 and includes a detection module 202, a determination module 204, a generation module 206, and an update module 208.

The detection module 202 detects referenced content 118 in an electronic communication. As used herein, referenced content 118 refers to a link, pointer, or other locator that is directed at content stored in an external repository 116. The content may be a file, an object, or other collection of data as known in the art. Furthermore, an external repository 116 refers to a storage location that is external, or outside of the electronic communication. One example of referenced content 118 a file stored on a company repository 116 with a URL link directed to the file or a file stored on the Internet with a URL link directed to the file.

Moreover, electronic communication may be an email, an instant message, a voicemail or other audio communication, a video communication, and the like. An electronic communication may have one or more recipients, described in greater detail below.

In one embodiment, the detection module 202 detects referenced content 118 by analyzing electronic communication received by the messaging server 108. For example, the detection module 202 may parse textual-based electronic communication such as email and search for patterns indicative of a link or pointer to external content. In another embodiment, the detection module 202 uses natural language processing and intercepts an audio-based electronic message to identify referenced content 118 embodied as audio. For example, a user may send an audio call in which the user states, "Check out the photo of my birthday cake on my Facebook profile." The detection module 202 recognizes that the user is referring to a photo called "birthday cake" on his or her Facebook profile.

The detection module 202 detects referenced content 118 associated with a registered external repository connector 112, or external repository connector that is compatible with the content access controller 110. The referenced content 118 identifies a registered external repository connector 112. For example, referenced content 118 may include one or more external repository connector identifiers such as a filename, keyword, domain, URL, file path, and the like. An external repository connector identifier may include indicia of the external repository 116 on which the referenced content 118 resides and/or the server that hosts the referenced content 118. For example, a reference to content that ends in the domain "ibm.com" has an external repository connector identifier of "ibm.com" that identifies that the content resides on a repository 116 hosted by a server affiliated with IBM. Using this external repository connector identifier, the detection module 202 may determine whether a registered external repository connector 112 exists with which to interface.

In one embodiment, the detection module 202 maintains a registry to track external repository connector identifiers and the associated registered external repository connectors 112. The registry may be implemented in a data structure as is known in the art. The registry may allow custom processing for specific referenced content 118. For example, if the detection module 202 detects referenced content 118 with "somequickr.com" as the domain for the referenced content 118, the detection module 202 references "somequickr.com" in the registry and finds that this domain is an external repository connector identifier associated with the IBM Lotus Quickr registered external repository connector 112. This connector 112 may then be used to control access and access rights for the referenced content 118.

The determination module 204 determines the type of access associated with a recipient for referenced content 118. Specifically, in one embodiment, the determination module 204 determines a status of an entry in an Access Control List ("ACL") for the referenced content 118 for a recipient of the electronic communication. As used herein, an ACL is a list of permissions associated with content. The permissions may include accessing the content. Furthermore, access, as defined in an ACL, may include access rights known in the art such as READ access rights, meaning a recipient may read, view, and/or open the content, READ and WRITE access rights, which grant all the READ access rights while allowing the recipient to also write to the content, modify the content, and/or delete the content, and no access rights, in which the recipient cannot open or modify the content.

In one embodiment, the content server 114 includes a plurality of ACLs to control access to content that the server manages. In certain embodiments, an ACL is associated with a single content element such as a file or object in a one-to-one relationship. In another embodiment, an ACL is associated with a group of files or objects, an entire repository 116 or portion of a repository 116, a domain, and the like. For example, a group of files may share a single ACL that controls access to the group of files. One skilled in the art realizes the various methods in which one or more ACLs may be associated with referenced content 118.

An ACL may have entries for an accessing party such as a single user, a group, a domain, and the like. These entries may include the name of the accessing party and the access granted. For example, an ACL entry for the referenced content 118 "sample file" may recite "(John_Doe@ibm.com, READ/WRITE)," granting the user with the email address "John_Doe@ibm.com" access privileges to read and write sample file. One skilled in the art realizes that an ACL entry may associate an electronic address such as an email address with a privilege, a person's name with a privilege, a domain with a privilege, and the like.

A recipient of the electronic communication may include a user, group of users, domain, organization, and the like to which the electronic communication is directed or sent or to which the electronic communication has been directed or sent. For example, in an email, the recipient may be the email address in the "To" field. In addition, a recipient may also be addresses in the "CC" field, "BCC" field, and the like. Furthermore, the determination module 204 may also determine recipients from anywhere in the email chain. For example, an email that previously had been forwarded to certain addresses may also be recipients even those certain addresses are not among the current addressees. An email chain may include email addresses that the email was sent to during the life of the email and whose addresses appear in the data of the email body or metadata of the email file. The determination module 204 may include user preferences to control the determination of what constitutes a recipient. For example, the determination module 204 may be configured to only designate those addresses in the "To:" field as recipients and disregard any past recipients. One skilled in the art realizes the various ways in which the determination module 204 may be configured to determine recipients.

Similarly, in other forms of electronic communication, a recipient may be the person, entity, or electronic address in which the electronic communication is sent or transmitted originally. In addition, a recipient may be a person, entity, or electronic address to which the electronic communication is later forwarded or copied. For example, a voice mail message may originally be left at a particular user's phone terminal. The particular user may then forward the message to other recipients.

Determining the status of an entry in an ACL may include determining that an ACL lacks an entry for a recipient of the electronic communication. In certain embodiments, having no ACL entry would prevent a user from any type of access to referenced content 118. Determining the status of an entry in an ACL may also include determining that the ACL for the referenced content 118 includes an entry for the recipient. Therefore, the status of an entry may indicate the presence or absence of an ACL entry for a recipient.

Determining the status of an entry may also include determining that the security policy has been updated when an ACL entry already exists under the former security policy. As described below, a security policy may specify rules for access by individuals, groups, or domains and may govern the type of access that is recorded in the ACL. If a recipient already has an ACL entry that identifies one form of access, but the security policy governing the ACL has been updated since the ACL entry was recorded, the ACL entry may need to be updated as described below. Therefore, the status of the entry in the ACL determined by the determination module 204 may also include information that an existing entry requires updating.

In one embodiment, the determination module 204 determines the status of an ACL entry by invoking the registered external repository connector 112 for the recipient to query if the recipient has access to the referenced content 118 on the target system. The registered external repository connector 112 replies with a positive or negative response if the recipient has access, and/or replies with the access level assigned to the recipient.

The generation module 206 generates an ACL entry for the recipient in response to the status of the entry in the ACL indicating that the ACL for the referenced content 118 lacks an entry in the ACL for the recipient. In this manner, if electronic communication has been sent to a recipient, the generation module 206 may implicitly assign a form of access for the referenced content 118 to the recipient. In addition, because the generation module 206 generates an ACL entry, the access for the recipient is stored to ensure consistent access to the referenced content 118 in the future. For example, if a first employee sends an instant message to a second employee that references content on a company server, the second employee is automatically granted READ and WRITE access to the referenced content 118. In the future, the second employee may continue to have READ and WRITE access even if the referenced content 118 is not accessed through the link in the original electronic communication.

The ACL entry and the privileges and access rights defined in the ACL entry are based on a security policy associated with the recipient. A security policy is specifies the privileges to grant a recipient based on the identity of the sender, the identity of the recipient, a domain for the recipient, a domain for the sender, the registered external repository connector 112 for the referenced content 118, a domain identified for the referenced content 118, a filename for the referenced content 118, and/or a keyword in the filename for the referenced content 118. One skilled in the art realizes the variety of ways in which a security policy may specify the rights associated with an ACL entry.

For example, if the domain of the recipient indicates that the recipient is a competitor to the company affiliated with the domain of the content server 114, the security policy may specify that the ACL for the recipient grants the recipient no access rights. Likewise, if the domain of the recipient indicates that the recipient is a business partner, the security policy may indicate that the recipient is granted READ access rights. If the domain of the recipient indicates that the recipient is a co-worker, the security policy may indicate that the recipient is granted READ and WRITE access rights. The security policy may be configured by a user, a group or users, a company, a content server 114, and the like.

The generation module 206 may also associate a timestamp or date with an ACL entry. In this manner, the generation module 206 may set an expiration date on access rights for referenced content 118. Consequently, the access rights in the ACL for recipients of the referenced content 118 may be configured to change when the expiration date is reached. For example, if READ and WRITE access was initially granted to the recipients, the access may be changed to READ access after the expiration. One skilled in the art realizes that other policy directives may be associated with referenced content 118.

For example, the generation module 206 may associate a change notification with an ACL for referenced content 118. As a result, whenever the referenced content 118 is modified, those with ACL entries may receive notification of the change.

In one embodiment, the generation module 206 directly generates an ACL entry on the content server 114 or in the application the ACL resides. In another embodiment, the generation module 206 signals the registered external repository connector 112 to generate an ACL entry.

The update module 208 updates an ACL entry for the recipient in response to the status of the entry in the ACL indicating that the ACL for the referenced content 118 includes an entry for the recipient and that the security policy has been updated. As stated above, if a recipient has an existing ACL entry that is out of date, the update module 208 may update the existing ACL entry. The ACL entry may be outdated as a result of the security policy changing or as a result of a change in the status of the recipient.

For example, a first employee, who works at a company with a second employee in a different department, sends an email to the second employee. The second employee has an existing ACL that grants the second employee READ access rights. However, assuming the security policy has been updated to allow employees in different departments both READ and WRITE access, the update module 208 updates the ACL entry to grant READ and WRITE access privileges.

Figure 3:
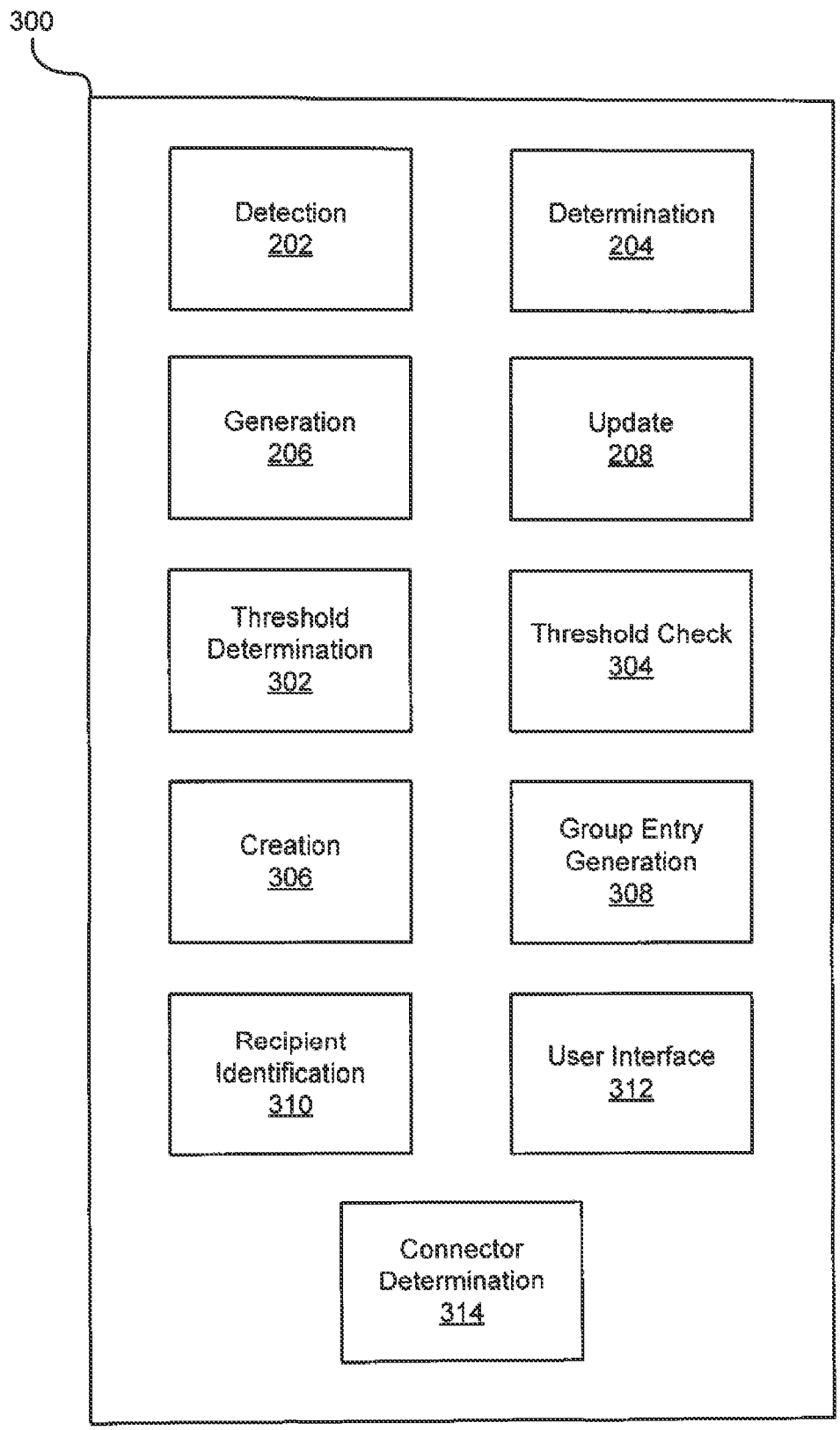
FIG. 3 is a detailed schematic block diagram illustrating another embodiment of a computer program product for sharing referenced content through collaborative business applications in accordance with the present invention.

FIG. 3 illustrates another embodiment of a computer program product 300 for sharing referenced content 118 through collaborative business applications in accordance with the present invention. The computer program product 300 includes the detection module 202, the determination module 204, the generation module 206, and the update module 208, wherein these modules include substantially the same features as described above in relation to FIG. 2. Additionally, in one embodiment, the computer program product 300 includes a threshold determination module 302, a threshold check module 304, a creation module 306, a group entry generation module 308, a recipient identification module 310, a user interface module 312, and a connector determination module 314.

The threshold determination module 302 determines an access control threshold for the registered content. The access control threshold includes a maximum number of ACL entries permitted to define access rights to the referenced content 118. The amount of fine-grained access control can decrease the efficiency of the content server 114 or the system by, for example, increasing the ACL queries made. Furthermore, each content server 114 may have a different access control threshold.

In one embodiment, the threshold determination module 302 interfaces with the registered external repository connector 112 to determine the access control threshold for the content server 114. In another embodiment, the content access controller 110 may have a global access control threshold to be applied to all referenced content 118. In certain embodiments, the access control threshold is stored in the registry.

The threshold check module determines that generating the ACL entry for the recipient causes a number of ACL entries for the referenced content 118 to exceed the access control threshold. For example, if the access control threshold equals 100 explicit entries for a particular piece of referenced content 118 and generating an ACL entry would cause the number of explicit entries to exceed 100, the threshold check module determines that the access control threshold will be exceeded. The threshold check module may signal the creation module 306 described below, or may alert the sender that the threshold has been reached or that the threshold is near.

The threshold check module may also prompt the user to suggest allowing general access to the referenced content 118 in response to the number of ACL entries exceeding a threshold.

The creation module 306 dynamically creates an access group in response to generating the ACL entry for the recipient causing a number of ACL entries for the referenced content 118 to exceed the access control threshold. The access group includes the one or more recipients having access rights for the referenced object. In one embodiment, the access group is stored in the content server 114 and specifies the recipients that constitute the access group.

The creation module 306 may also create an access group in response to input from a user explicitly requesting that an access group be created. For example, a send of electronic communication may request that the recipients of the electronic communication form an access group. The sender may specify the privileges that the access group will receive.

The creation module 306 may also prompt a user to inquire if an access group should be formed. For example, if the creation module 306 detects that similar referenced content 118 is repeatedly sent to the same recipients, the creation module 306 may prompt the user regarding an access group with these recipients.

The group entry generation module 308 generates an ACL entry for the access group. The ACL entry controls access to the referenced content 118 for the access group. The ACL entry, like those described above, is defined based on the security policy. This allows the content server 114 to provide the same ACL, but reduce the amount of ACL entries and by extension, the amount of ACL checks to a single community instead of many recipients.

The recipient identification module 310 identifies one or more primary recipients and one or more secondary recipients. The recipient identification module 310 grants access to the referenced content 118 to the one or more primary recipients based on a primary recipient security policy and grants access to the referenced content 118 to the one or more secondary recipients based on a secondary recipient security policy. In this manner, recipients of the same electronic communication may receive different levels of access based on whether the recipient is a primary recipient or a secondary recipient.

The primary recipient security policy and the secondary recipient security policy may be subsets of the security policy and may be configurable by a user, company, at the domain level, and the like. For example, a sender may configure a primary recipient security policy to allow READ and WRITE access to referenced content 118 and configure a secondary security policy to allow READ access to a secondary recipient.

The user interface module 312 prompts a user in response to determining that the ACL for the referenced content 118 lacks the entry for the recipient. For example, before an ACL entry for a recipient is generated, the user interface module 312 may first prompt the user to ensure that the recipient should be granted access. In one embodiment, the user may specify the level of access to allow the recipient.

The user interface module 312 receives an acknowledgment from the user to generate the ACL entry for the recipient. The generation module 206 generates the ACL entry for the recipient in response to the user acknowledgement and the recipient lacking the entry in the ACL for the referenced content 118. The user interface module 312 may also prompt the user before updating an existing ACL for a recipient if the security policy has changed.

The user interface module 312 may prompt the user for a variety of reasons such as a suggestion to form an access group, alerting a recipient or sender that referenced content 118 has been updated, or notifying a recipient that access has been granted to referenced content 118. Furthermore, the user interface module 312 may also receive user input to form access groups, grant access when prompted, and the like. The user interface module 312 may be implemented with software user interface designs and applications as known in the art.

The connector determination module 314 determines a registered external repository connector 112 based on the referenced content 118. As described above, the referenced content 118 may include an external repository connector identifier. The connector determination module 314 may analyze the registry to determine if an external repository connector identifier from referenced content 118 matches an identifier in the registry. The connector determination module 314 may then identify the registered external repository connector 112 that corresponds to the identifier. The connector determination module 314 may also determine if the referenced content 118 fails to correspond with a registered external repository connector 112.

Figure 4:
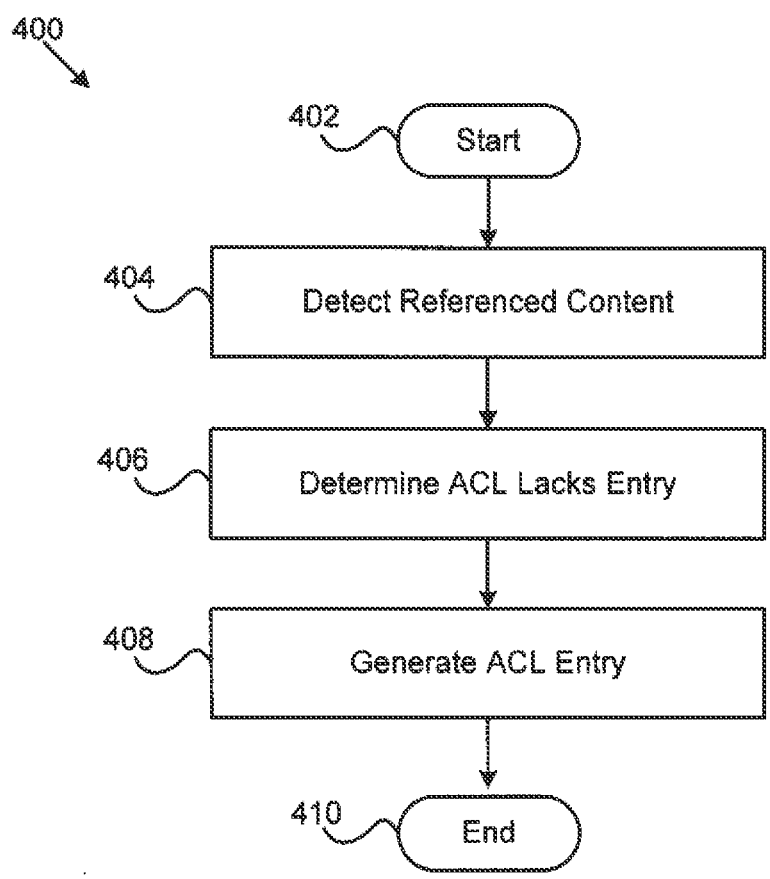
FIG. 4 is a schematic flow chart diagram illustrating a method for sharing referenced content through collaborative business applications in accordance with the present invention.

FIG. 4 illustrates a method 400 for sharing referenced content 118 through collaborative business applications in accordance with the present invention. The method 400 begins 402 and the detection module 202 detects 404 referenced content 118 in an electronic communication. The referenced content 118 references content stored in an external repository 116 and the referenced content 118 identifies a registered external repository connector 112. The determination module 204 then determines 406 that an ACL for the referenced content 118 lacks an entry for a recipient of the electronic communication. The generation module 206 then generates 408 an ACL entry for the recipient in response to the status of the entry in the ACL indicating that the ACL for the referenced content 118 lacks an entry in the ACL for the recipient. The ACL entry controls access to the referenced content 118 for the recipient and is defined based on a security policy associated with the recipient. Then, the method 400 ends 410.

Figure 5:
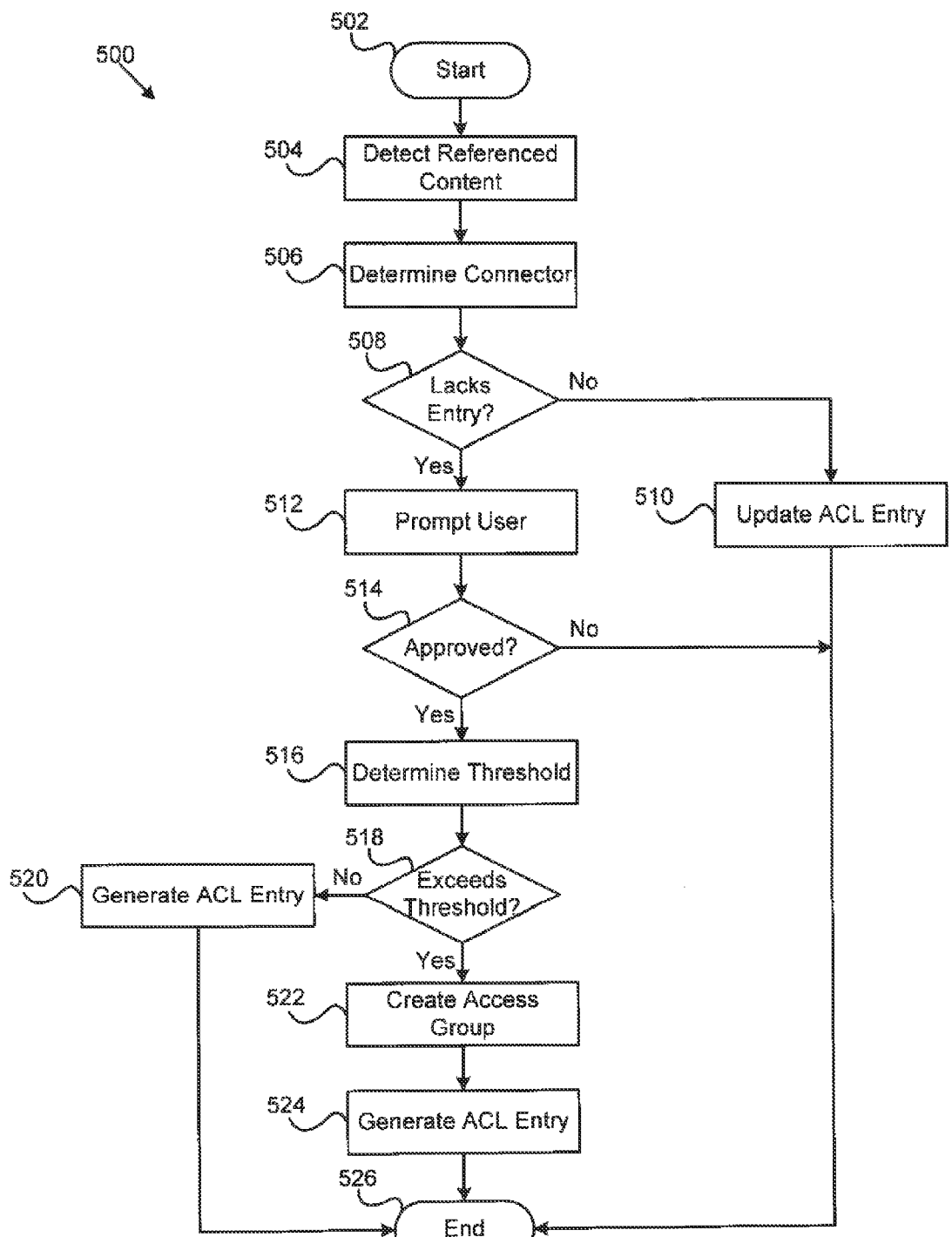
FIG. 5 is a detailed schematic flow chart diagram illustrating another embodiment of a method for sharing referenced content through collaborative business applications in accordance with the present invention.

FIG. 5 illustrates another embodiment of a method 500 for sharing referenced content 118 through collaborative business applications in accordance with the present invention. The method 500 begins 502 and the detection module 202 detects 504 referenced content 118 in an electronic communication. The connector determination module 314 then determines 506 a registered external repository connector 112 based on an external repository connector identifier in the referenced content 118. The determination module 204, using the registered external repository connector 112, then determines 508 that the ACL for the referenced content 118 includes an entry for the recipient and that the security policy has been updated. The update module 208 updates 510 the existing ACL entry to reflect the new security policy, and the method 500 ends 526.

Alternatively, the determination module 204 determines 508 that the ACL for the referenced content 118 lacks an entry in the ACL for the recipient. Optionally, the user interface module 312 prompts 512 the sender to approve the granting of access to the recipient. If the sender does not approve 514, the method 500 ends 526. If the sender approves 514, the threshold determination module 302 determines 516 an access control threshold for the registered content. Then, the threshold check module determines 518 that generating the ACL entry for the recipient does not cause a number of ACL entries for the referenced content 118 to exceed the access control threshold. The generation module 206 then generates 520 an ACL entry for the recipient according to the security policy and the method 500 ends 526.

Alternatively, the threshold check module determines 518 that generating the ACL entry for the recipient will cause a number of ACL entries for the referenced content 118 to exceed the access control threshold. The creation module 306 dynamically creates 522 an access group that includes the one or more recipients having access rights for the referenced object. The group entry generation module 308 generates 524 an ACL entry for the access group that controls access to the referenced content 118 for the access group. Then, the method 500 ends 526.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for sharing referenced content through collaborative business applications, the method comprising:
   detecting referenced content in an electronic communication that is processed by a messaging server, the referenced content referencing content stored in an external repository, wherein the electronic communication is a select one of: an instant message, an audio communication, and a video communication;
   identifying an access control list for the referenced content, wherein an external content element listed in the access control list includes a group having at least one user entry with permissions to access that content element;
   determining a registered external repository connector associated with the detected content, where the external repository connector interfaces with a content server associated with the external repository and is registered with a content access controller that controls access to the referenced content based upon the access control list;
   determining recipients based upon current addressees of the electronic communication;
   determining further recipients within a chain of electronic communications associated with the electronic communication, where any further recipients are not among the current addressees in the electronic communication;
   determining, with the registered external repository connector, that the access control list for the referenced content lacks an entry for a recipient associated with the electronic communication; and
   updating the access control list by generating an entry in the access control list for the recipient in response to the recipient lacking an entry in the access control list for the referenced content, the entry controlling access to the referenced content for the recipient.

2. The method of claim 1, further comprising
   determining that the access control list for the referenced content includes an entry for the recipient;
   determining that a security policy associated with the recipient has been updated; and
   updating the access control list entry for the recipient in response to determining that the access control list for the referenced content includes the entry for the recipient and that the security policy has been updated.

3. The method of claim 2, wherein the security policy is associated with one or more of a domain for the recipient, the registered external repository connector for the referenced content, a domain identified for the referenced content, a filename for the referenced content, and a keyword in the filename for the referenced content.

4. The method of claim 1, wherein determining a registered external repository connector comprises determining an external repository connector for communicating with the content repository through the content server using a supported programming interface of the external repository.

5. The method of claim 1, further comprising identifying one or more primary recipients and one or more secondary recipients, and granting access to the referenced content to the one or more primary recipients based on a primary recipient security policy and granting access to the referenced content to the one or more secondary recipients based on a secondary recipient security policy.

6. The method of claim 1, further comprising:
   prompting a user in response to determining that the access control list for the referenced content lacks the entry for the recipient;
   receiving an acknowledgment from the user to generate the access control list entry for the recipient; and
   generating the access control list entry for the recipient in response to the user acknowledgement and the recipient lacking the entry in the access control list for the referenced content.

7. The method of claim 1, further comprising identifying an external repository connector identifier to determine whether a registered external repository connector exists with which to interface.

8. The method of claim 1, wherein detecting referenced content further includes using natural-language processing to identify referenced content in an audio communication.

9. The method of claim 1, wherein determining a registered external repository connector further includes:
   determining if the electronic communication includes a domain name; and
   using a registered external repository connector associated with the determined domain name.

10. A computer readable storage medium having code for sharing referenced content through collaborative business applications, wherein the code instructs a processor to perform:
   a detection module configured to:
      detect referenced content in an electronic communication that is processed by a messaging server, the referenced content referencing content stored in an external repository, wherein the electronic communication is a select one of: an instant message, an audio communication, and a video communication, the referenced content further identifying a registered external repository connector, where the external repository connector interfaces with a content server associated with the external repository and is registered with a content access controller that controls access to the referenced content;

a determination module configured to:

identify an access control list for the referenced content, wherein an external content element listed in the access control list includes a group having at least one user entry with permissions to access that content element, wherein the content access controller controls access to the referenced content based on the access control list;

determine, with the registered external repository connector, a status of an entry in the access control list for the referenced content for a recipient of the electronic communication;

determine recipients based upon current addressees of the electronic communication;

determine further recipients within a chain of electronic communications associated with the electronic communication, where any further recipients are not among the current addressees in the electronic communication;

a generation module configured to update the access control list by generating an access control list entry for the recipient in response to the status of the entry in the access control list indicating that the access control list for the referenced content lacks an entry in the access control list for the recipient, the access control list entry controlling access to the referenced content for the recipient.

11. The computer readable storage medium of claim 10, further comprising:

code configured to determine that the access control list for the referenced content includes an entry for the recipient;

code configured to determine that a security policy associated with the recipient has been updated; and code configured to update the access control list entry for the recipient in response to determining that the access control list for the referenced content includes the entry for the recipient and that the security policy has been updated.

12. The computer readable storage medium of claim 11, wherein the security policy is associated with one or more of a domain for the recipient, the registered external repository connector for the referenced content, a domain identified for the referenced content, a filename for the referenced content, and a keyword in the filename for the referenced content.

13. The computer readable storage medium of claim 10, wherein the code configured to determine a registered external repository connector comprises code configured to determine an external repository connector that is registered with the content access controller of the messaging server for determining access rights to content, granting access rights to content, and defining new access control groups.

14. The computer readable storage medium of claim 10, further comprising a recipient identification module configured to identify one or more primary recipients and one or more secondary recipients, and grant access to the referenced content to the one or more primary recipients based on a primary recipient security policy and grant access to the referenced content to the one or more secondary recipients based on a secondary recipient security policy.

15. The computer readable storage medium of claim 10, further comprising a user interface module configured to prompt a user in response to determining that the access control list for the referenced content lacks the entry for the recipient, the user interface module further configured to receive an acknowledgment from the user to generate the access control list entry for the recipient, and the generation module further configured to generate the access control list entry for the recipient in response to the user acknowledgement and the recipient lacking the entry in the access control list for the referenced content.

16. The computer readable storage medium of claim 10, further comprising code configured to identify an external repository connector identifier to determine whether a registered external repository connector exists with which to interface.

17. A system for sharing referenced content through collaborative business applications, the system comprising:

a server having a processor and memory, the memory comprising code that is executed by the processor to implement:

a detection module configured to:

detect referenced content in an electronic communication that is processed by a messaging server, the referenced content referencing content stored in an external repository, wherein the electronic communication is a select one of: an instant message, an audio communication, and a video communication, the referenced content further identifying a registered external repository connector, where the external repository connector interfaces with a content server associated with the external repository and is registered with a content access controller that controls access to the referenced content;

a determination module configured to:

identify an access control list for the referenced content, wherein an external content element listed in the access control list includes a group having at least one user entry with permissions to access that content element, wherein the content access controller controls access to the referenced content based on the access control list;

determine, with the registered external repository connector, a status of an entry in the access control list for the referenced content for a recipient of the electronic communication;

determine recipients based upon current addressees of the electronic communication;

determine further recipients within a chain of electronic communications associated with the electronic communication, where any further recipients are not among the current addressees in the electronic communication;

a generation module configured to update the access control list by generating an access control list entry for the recipient in response to the status of the entry in the access control list indicating that the access control list for the referenced content lacks an entry in the access control list for the recipient, the access control list entry controlling access to the referenced content for the recipient.

18. The system of claim 17, wherein the code within the memory configured to determine a registered external repository connector comprises code configured to determine an external repository connector for communicating with the content repository through the content server using a supported programming interface of the external repository.

19. The system of claim 17, wherein the code within the memory configured to determine a registered external repository connector comprises code configured to determine an external repository connector that is registered with the content access controller of the messaging server for determining access rights to content, granting access rights to content, and defining new access control groups.

20. The system of claim 17, further comprising code configured to identify an external repository connector identifier to determine whether a registered external repository connector exists with which to interface.

* * * * *